United States Patent
Alabbad et al.

(10) Patent No.: US 11,829,919 B2
(45) Date of Patent: Nov. 28, 2023

(54) METHODS FOR PEOPLE-DRIVEN, NEAR-REAL TIME AUDITABLE WELL INTERVENTION PROGRAM

(71) Applicant: SAUDI ARABIAN OIL COMPANY, Dhahran (SA)

(72) Inventors: Emad Abbad M. Alabbad, Dammam (SA); Shaima Hussain Alshawaf, Alhassa (SA); Ahmad Mohammadameen Almousa, Mubarraz (SA); Fuad AlSultan, Alahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/364,172

(22) Filed: Jun. 30, 2021

(65) Prior Publication Data

US 2023/0004912 A1  Jan. 5, 2023

(51) Int. Cl.
| | |
|---|---|
| G06Q 10/06 | (2023.01) |
| G06Q 10/0637 | (2023.01) |
| G06Q 10/0631 | (2023.01) |
| G06Q 50/02 | (2012.01) |
| G06Q 10/0639 | (2023.01) |
| G05B 13/02 | (2006.01) |

(52) U.S. Cl.
CPC ... *G06Q 10/06375* (2013.01); *G05B 13/0265* (2013.01); *G06Q 10/06313* (2013.01); *G06Q 10/06393* (2013.01); *G06Q 10/06398* (2013.01); *G06Q 50/02* (2013.01)

(58) Field of Classification Search
None
See application file for complete search history.

(56) References Cited

U.S. PATENT DOCUMENTS

| 8,117,103 B2 | 2/2012 | Macy et al. |
| 8,731,999 B2 | 5/2014 | Nielsen et al. |
| 9,916,588 B2 | 3/2018 | Nielsen et al. |

(Continued)

FOREIGN PATENT DOCUMENTS

WO  2018067131 A1  4/2018

OTHER PUBLICATIONS

Skalle et al. (Wells and Well Intervention, Evaluation of deepwater kicks and future countermeasures, Norwegian University of Science and Technology and SINTEF/ExproSoft, 2003).*

(Continued)

*Primary Examiner* — Matthew D Henry
(74) *Attorney, Agent, or Firm* — Osha Bergman Watanabe & Burton LLP

(57) ABSTRACT

A method for a well intervention program is provided. The method includes selecting, from a number of well intervention mandates generated by a number of originators in an oil and gas industry hierarchy, mid-level mandates based on respectively originator rankings, wherein each of the number of well intervention mandates relates to a well intervention activity of the well intervention program, generating, based on respective pre-defined cycle times of the mid-level mandates, a most frequent timeframe, performing, based on a pre-determined audit criterion and over the most frequent timeframe, an audit of the well intervention program to generate an audit result, and presenting the audit result to the number of originators.

16 Claims, 6 Drawing Sheets

(56) References Cited

U.S. PATENT DOCUMENTS

| | | |
|---|---|---|
| 2006/0136250 A1 | 6/2006 | Farmilo |
| 2007/0180490 A1* | 8/2007 | Renzi .................... G06F 21/604 |
| | | 726/1 |
| 2007/0203648 A1* | 8/2007 | Poedjono ............. E21B 47/022 |
| | | 701/301 |
| 2012/0116829 A1 | 5/2012 | Tan et al. |
| 2013/0006718 A1 | 1/2013 | Nielsen et al. |
| 2015/0356450 A1 | 12/2015 | Dursun et al. |
| 2021/0382198 A1* | 12/2021 | Cheng .................... G06F 30/20 |

OTHER PUBLICATIONS

Noshi, C. I. and Schubert, J. J., "The Role of Machine Learning in Drilling Operations; A Review", SPE-191823-18ERM-MS, Society of Petroleum Engineers, Oct. 2018 (16 pages).

1st Examination Report issued in corresponding Saudi Patent Application No. 122431276, dated Jun. 22, 2023 (14 pages).

Ruslan, Mohd Zahirin B et al., "Integrated Approach: Perforation System Optimization for Sand Prevention"; Proceedings of the SPE Oil and Gas India Conference and Exhibition; Paper No. SPE-128569-MS; pp. 1-19; Jan. 20, 2010 (19 pages).

\* cited by examiner

METHODS FOR PEOPLE-DRIVEN, NEAR-REAL TIME AUDITABLE WELL INTERVENTION PROGRAM

BACKGROUND

A well intervention is an operation performed at an oil, gas, or water well during, or at the end of, the well's productive life, which makes it a major component of the upstream operational expenditure (OPEX). Well interventions alter the state of the well or well geometry, provide well diagnostics, or manage the production of the well. During light interventions, operators lower tools or sensors into a live well while pressure is contained at the surface. In heavy interventions, the operators may stop production at the formation before making major equipment changes.

Light interventions are usually performed using slickline, wireline, or coiled tubing to minimize the possibility of potential well blockages. Light interventions are also performed to change or adjust downhole equipment such as valves or pumps, or to gather downhole pressure, temperature, and flow data.

Heavy interventions, also referred to as workovers, require the wellhead and other pressure barriers to be removed from the well to allow full access to the wellbore. To perform heavy interventions, a rig is used to remove and reinstall the wellhead and completion equipment.

SUMMARY

In general, in one aspect, the invention relates to a method for a well intervention program. The method includes selecting, from a plurality of well intervention mandates generated by a plurality of originators in an oil and gas industry hierarchy, mid-level mandates based on respectively originator rankings, wherein each of the plurality of well intervention mandates relates to a well intervention activity of the well intervention program, generating, based on respective pre-defined cycle times of the mid-level mandates, a most frequent timeframe, performing, based on a pre-determined audit criterion and over the most frequent timeframe, an audit of the well intervention program to generate an audit result, and presenting the audit result to the plurality of originators.

In general, in one aspect, the invention relates to a system for a well intervention program. The system includes a well control system for performing well intervention activities of the well intervention program, and a well intervention management system that includes a program mandate engine configured to select, from a plurality of well intervention mandates generated by a plurality of originators in an oil and gas industry hierarchy, mid-level mandates based on respectively originator rankings, wherein each of the plurality of well intervention mandates relates to a well intervention activity of the well intervention program, an activity plan engine configured to generate, based on respective pre-defined cycle times of the mid-level mandates, a most frequent timeframe, an audit engine configured to perform, based on a pre-determined audit criterion and over the most frequent timeframe, an audit of the well intervention program to generate an audit result, and a program management and artificial intelligence (AI) engine configured to present the audit result to the plurality of originators.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a method for a well intervention program. Initially, a collection of well intervention mandates is generated by a number of originators in an oil and gas industry hierarchy. The well intervention mandates are categorized, based on respectively originator rankings, into macro-level mandates, mid-level mandates, and micro-level mandates. A well intervention activity plan is generated that specifies attributes of the well intervention activity for each of the well intervention mandates. A most frequent timeframe is generated based on respective pre-defined cycle times of the mid-level mandates. An audit of the well intervention program is performed, based on a pre-determined audit criterion and over the most frequent time frame, to generate an audit result. The audit result is then presented to the originators throughout the oil and gas industry hierarchy. On-going audits of the well intervention program are routinely performed to generate audit results. A machine learning algorithm is used to generate an artificial intelligence (AI) model of the well intervention program based on the ongoing audit results. Accordingly, the well intervention mandates of the well intervention program are adjusted based on the AI model to enhance subsequent execution of the well intervention program.

Figure 1A:
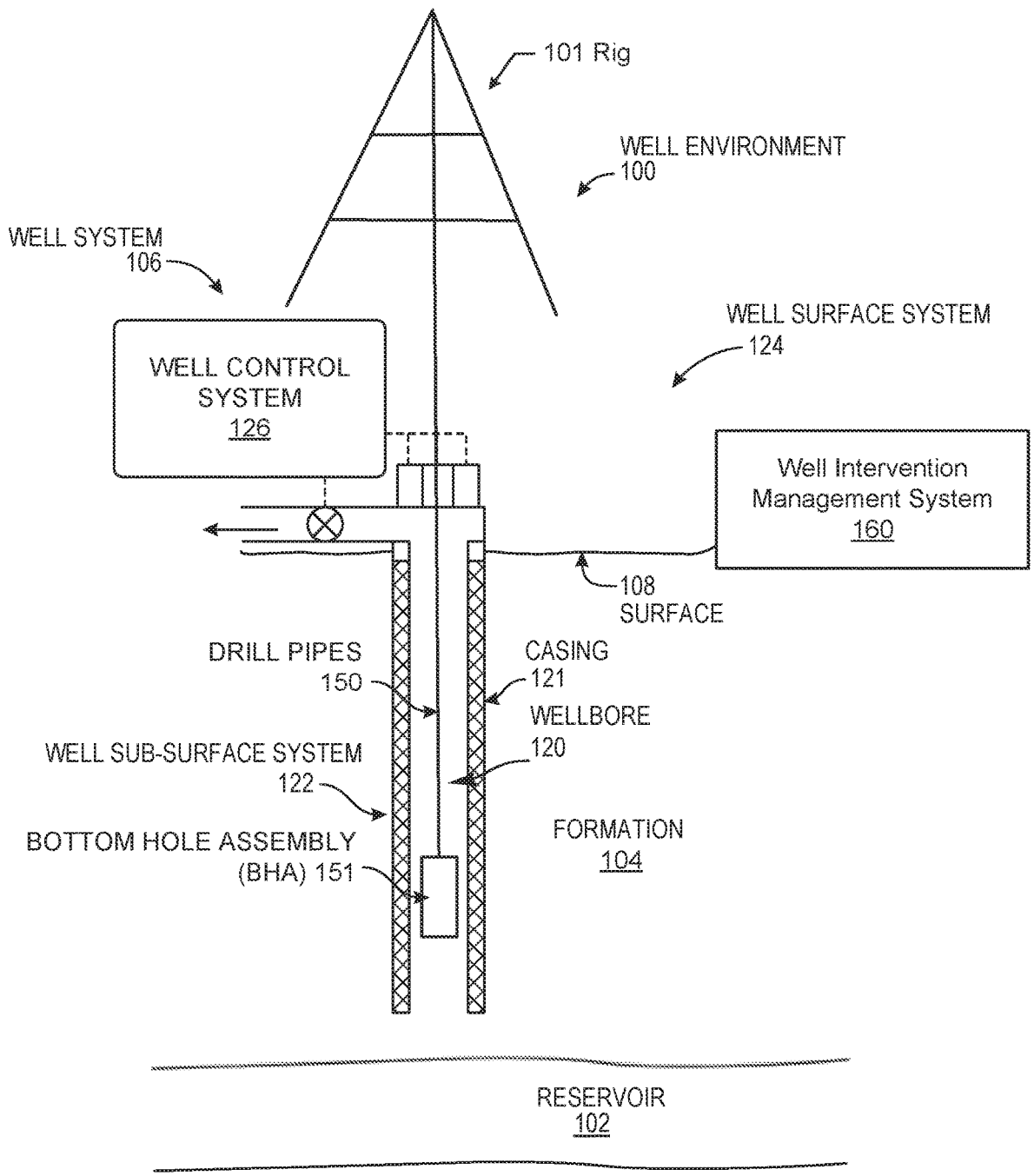
FIGS. 1A and 1B show systems in accordance with one or more embodiments.

FIG. 1A shows a schematic diagram in accordance with one or more embodiments. As shown in FIG. 1A, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120) with a casing (121), a well sub-surface system (122), a well surface system (124), and a well control system ("control system") (126). The well control system (126) may control various operations of the well system (106), such as well production operations, well drilling operation, well completion operations, well maintenance operations, and reservoir monitoring, assessment and development operations. For example, the well maintenance operations may include the well intervention operations in the wellbore (120). In particular, the well intervention operations relate to well drilling, completion, downhole surveillance, stimulation, downhole or wellhead maintenance work that are planned and executed through engineered rig-less or rig operations. Planning, executing, auditing, and other management tasks associated with the well intervention are collectively referred to as the well intervention program.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment. Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

The wellbore (120) includes a bored hole (i.e., borehole) that extends from the surface (108) towards a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations for the wellbore (120) to extend towards the target zone of the formation (104) (e.g., the reservoir (102)), facilitate the flow of hydrocarbon production (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of monitoring devices (e.g., logging tools) lowered into the formation (104) or the reservoir (102) during monitoring operations (e.g., during in situ logging operations).

In some embodiments, the well system (106) is provided with a bottom hole assembly (BHA) (151) attached to a suitable conveyance method such as drill pipes (150) for rig operations to suspend into the wellbore (120) for performing the well drilling operation. The bottom hole assembly (BHA) is the lowest part of a drill string and includes the drill bit, drill collar, stabilizer, mud motor, etc. The well system (106) may also be provided with slickline, wireline, coiled tubing, downhole equipment such as valves, pumps, pressure/temperature/flow sensors, and other completion equipment of the casing (121).

In some embodiments, the well system (106) is further provided with a well intervention management system (160). For example, the well intervention management system (160) may include hardware and/or software with functionality to manage or otherwise facilitate well intervention programs. In some embodiments, the well intervention management system (160) includes a computer system, such as a portion of the computing system described in reference to FIGS. 4A-4B below.

The well intervention programs reflect the dynamic nature of oil and gas industry in two critical aspects. Firstly, well intervention programs are necessary for developing and producing oil and gas fields and constitute a considerable amount of the upstream operations expenditure. Secondly, well intervention programs encompass a wide array of frontline engineering and operational activities that ultimately have strong interlinking impacts with the pertinent high-level strategies and directions of the oil and gas industry. Therefore, the ability to efficiently audit well interventions may be a challenging task especially that such audits commonly cover multiple scopes (e.g., technical, regulatory, environmental, safety, financial, performance, etc.). For example, auditing gas wells for tubing metal loss surveillance against instituted frequency may be frequently required by the respective well integrity standards while surveillance results validation efficiency may be necessitated for performance assessment. Similarly, maintaining an effective alignment and proactive contributions between frontline level employees (e.g., engineers/SMEs) and high-level objectives remain a challenge especially given the growing volatility of the oil and gas economics that cause frequent target changes, and the continuously evolving/transforming strategies that require tapping into multi-discipline human resources (e.g., engineer, lab scientists, pump operators) for realization rather than making requirement enforcement. For example, an NOC (national oil company) strategy to reduce ground water utilization in well stimulation operations may not be effectively and timely achievable if all multi-discipline human resources are not tapped into to find feasible ways to achieve the strategy (e.g., by multi-pronged approach based on alternative water sources, design with reduced water quantities). Accordingly, the well intervention management system (160) is used to manage these challenges by enabling well intervention programs auditability on a near-real time basis for an entire business cycle, and attracting and aligning the contributions of multi-discipline human resources (not limited to high-level decision makers) to effectively drive positive business results.

While the well intervention management system (160) is shown at a well site in FIG. 1A, those skilled in the art will appreciate that the well intervention management system (160) may also be remotely located away from well site.

Figure 1B:
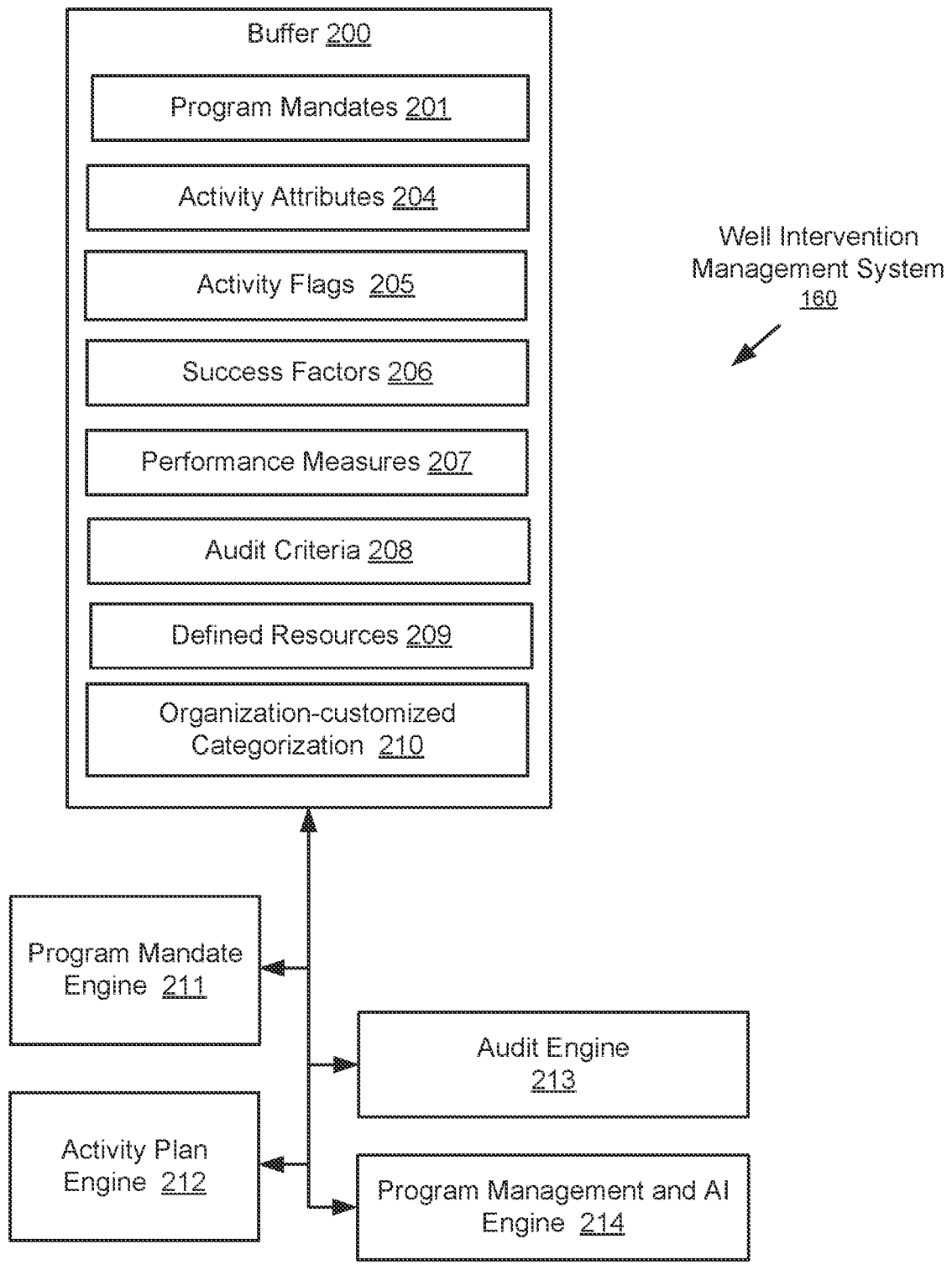

Turning to FIG. 1B, FIG. 1B illustrates a portion of the well intervention management system (160) depicted in FIG. 1A above. In one or more embodiments, one or more of the modules and/or elements shown in FIG. 1B may be omitted, repeated, combined and/or substituted. Accordingly, embodiments disclosed herein should not be considered limited to the specific arrangements of modules and/or elements shown in FIG. 1B.

As shown in FIG. 1B, FIG. 1B illustrates the well intervention management system (160) including has multiple components. For example, well intervention management system (160) has a buffer (200), a program mandate engine (211), an activity plan engine (212), an audit engine (213), and a program management and artificial intelligence (AI) engine (214). Each of these components (211, 212, 213, 214) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments, the buffer (200) may be implemented in hardware (i.e., circuitry), software, or any combination thereof. The buffer (200) is configured to store data generated and/or used by the well intervention management system (160). The data stored in the buffer (200) includes the program mandates (201), the activity attributes (204), the activity flags (205), the success factors (206), the performance measures (207), the audit criteria (208), the defined resources (209), and the organization-customized categorization (210).

The program mandates (201) are data records describing well intervention related requirements and/or expectations, such as safety requirements, environmental regulations, etc. The program mandates (201) are categorized according to pre-defined levels (e.g., macro-level, mid-level, micro-level) of multi-discipline human resources contributing to the well intervention programs. The multi-discipline human resources contributing to the well intervention programs are referred to as originators of the program mandates (201). In one or more embodiments, the macro-level mandates are defined by top management (e.g., related to corporate strategies that impact all sub-levels of business), the mid-level mandates are defined by middle and low-level managements (e.g., related to specific-subject business entities), and the micro-level mandates are defined by frontline employees (e.g., related to individual roles). For example, for coiled tubing well intervention operations, the macro-level mandates include setting strategic objectives and targets to maintain wells using the coiled tubing technology, the mid-level mandates include contracting with service providers, planning training opportunities, and providing logistical resources, and the micro-level mandates include performing engineering job evaluation and engineering design.

The activity attributes (204) are general attributes describing general properties of respective well intervention plans. In one or more embodiments, the activity attributes (204) include activity description, deliverable and closure criteria, timeline, weight, assignee/accountability/level, verifier, and status.

The activity flags (205) are special attributes describing impacting factors of respective well intervention plans. In one or more embodiments, the activity flags (205) include a people-drive flag, a performance measure flag, a gaps flag, a resources flag, and a categorization flag.

The success factors (206) are pre-defined measures associated with the people-drive flag to implement a reward-based aspect of the well intervention program. In one or more embodiments, the success factors (206) include a contribution measure, a people measure, a reward measure, a deliverable measure, a verifier measure, and a status measure.

The performance measures (207) are pre-defined measures based on well intervention program targets. In one or more embodiments, the performance measures (207) include performance measure definition, target, actual performance, and unit.

The audit criteria (208) are evaluation standards for determining success of a particular mandate. In one or more embodiments, the audit criteria (208) include timeliness, acceptance standard, and scoring standard.

The defined resources (209) are resources for respective well intervention programs. In one or more embodiments, the defined resources (209) include budget, material, manpower, technology, etc.

The organization-customized categorization (210) are custom attributes for selected well intervention programs. In one or more embodiments, the organization-customized categorization (210) includes geographical distribution, service seasonality, etc.

In one or more embodiments of the invention, each of the program mandate engine (211), activity plan engine (212), audit engine (213), and program management and AI engine (214) may be implemented in hardware (i.e., circuitry), software, firmware or any combination thereof.

In one or more embodiments, the program mandate engine (211) performs the function of a well intervention program mapping reviewer to capture, process, display, and archive well intervention data related to the program mandates (201). The well intervention program cycle consists of frequently updated mandates related to the well intervention processes across the organizational hierarchy such as well intervention requirement or services selections, engineering designs, and operational standards. Those mandates vs. their pre-defined cycle time (i.e., the duration needed to complete the subject mandate end-to-end) are mapped by the well intervention program mapping reviewer along their respective level of the organization structure. Mid-level mandates (i.e., neither macro nor micro-levels) are then examined by the well intervention program mapping reviewer for their cycle time to select the most frequent timeframe (used to define the business cycle) that fits the timeframe of the majority of those mandates (i.e., the most re-occurring cycle time among the mandates of mid-level entities of the organization).

Accordingly, the cycle times of all other mandates are reviewed and represented by the well intervention program mapping reviewer in terms of the selected frequency (i.e., either fully aligned to or a factor of the selected frequency). As a result, the business cycle is properly defined (based on the majority of activities at mid-level) and used as a standard to measure the cycle time for all business activities.

In one or more embodiments, the activity plan engine (212) performs the function of a smart well intervention activity developer to capture, process, display, and archive well intervention data related to the activity attributes (204) and activity flags (205).

Regarding the activity attributes (204), the smart well intervention activity developer is used to develop smart well intervention activity plans for the full-cycle implementation of each program mandate or process. In doing so, each plan is developed by defining at least the activity attributes (204) as shown, for example, in LIST 1 below:

List 1
- a) Action Description: define the specific activity to be done to achieve the task at hand.
- b) Deliverable and closure criteria: define the action outcome and documentation that can be used to satisfactorily verify the action completion.
- c) Timeline: The furthest end-time (within the defined business cycle) when the action can acceptably be completed.
- d) Weight: define the percentage impact of this action on delivering the mother mandate or process.
- e) Assignee/accountability/level: The person responsible of leading the action into closure.

f) Verifier: The person designated to review and verify action completion update closure.

g) Status: A measure considering the timeline, deliverable, and verification to define action completion status (e.g. open, overdue, completed, completed and verified).

Regarding the activity flags (205), the smart well intervention activity developer is used to flag those plans is done to interlink impacting factors by defining at least the smart flags (i.e., special attributes) as shown in LIST 2 below:

List 2 h) People-Drive: Determine whether the action is practically influenced by activities and/or contributions from mass individuals in the organizations. When set to "Yes," this flag inks to the well intervention success-factor enabler success factor m) in LIST 3 below.

i) Performance Measure: Indicate whether the action is directly feeding into a specific organizational key performance indicator or target. When set to "Yes," this flag inks to the well intervention success-factor enabler success factor s) in LIST 4 below.

j) Gaps: Indicate if the action is related to a gap identified from previous audits. When set to "Yes," this flag inks to the well intervention success-factor enabler success factor m) in LIST 3 below.

k) Resources: Indicate the level or type of resources needed to accomplish the action objectives. When set to "Yes," this flag inks to the well intervention enabler defined resources as described below.

l) Categorization: define customized indicators based on the specific need or structure of the well intervention program such as geography, seasonality, cycle phases, entity grouping, among others. When set to "Yes," this flag inks to the well intervention defined organization-customized categorization as described below.

In one or more embodiments, the audit engine (213) performs the functionality of a well intervention success-factor enabler to capture, process, display, and archive well intervention data related to the success factors (206), performance measures (207), audit criteria (208), defined resources (209), and organization-customized categorization (210).

The structure of well intervention programs is usually made up of various components, elements, and sub-elements such as processes, roles and responsibilities, and performance indicators to manage the overall activities and performance. Such programs may be run in different ways to suit each organization's needs and priorities (i.e., operating company such as NOC or IOC, service company). However, well interventions are commonly encountered with some challenges, especially in excellence-oriented systems. One example of those challenges is auditing the well intervention program which may be required frequently for various objectives such as technical, regulatory, environmental, safety, financial, or performance related. When conducting such audits, organizations often run into a contradiction between audit comprehensiveness and thoroughness on one hand, and audit timeliness and efficiency on the other hand. Another example of a challenge that well intervention programs may encounter is people drive. The effectiveness of people contributions (i.e., employees, leaders) to the success of running well intervention activities sometimes face challenging tradeoffs such as maintaining hierarchy control through target enforcement vs. enabling grass-root employee participation and engagement.

To implement near-real time auditability of the full cycle and the ability to efficiently attract and align people-drive towards positive business contributions (e.g., value generation, customer satisfaction, innovation) in synchronization with the dynamically-evolving strategies of the oil and gas industry, the well intervention success-factor enabler identifies the well intervention activities that has People-Drive flag set to "Yes" and identifies corresponding success factors that are defined via reward-based (i.e., incentivizing) approach as shown in LIST 3 below:

List 3 m) Contribution: Define the individual specific positive contributions impacting the flagged activity n) People: Indicator of the relevant people capable of influencing the subject activity (i.e. job family)

o) Reward: A measure proportional to the efforts required by the people to make the defined positive contribution to the subject activity and the level of impact of the contributions on achieving the activity objectives.

p) Deliverable: Define the outcome and/or documentation that can be used to satisfactorily verify the contribution to the activity is adequate.

q) Verifier: the person designated to review and verify contributions.

r) Status: A measure considering the deliverable and verification to define contribution validity status (e.g. submitted, accepted, rejected).

Further, the well intervention success-factor enabler identifies Performance measures (PM) based on well intervention program pre-defined targets as shown in LIST 4 below:

List 4 s) Performance measure definition: the formula based on which the performance is measured.

t) Target: the desired results by the end of business cycle.

u) Actual performance: the performance reported for a defined timeline within the business cycle.

v) Unit: measurement unit.

In addition, the well intervention success-factor enabler defines (i) audit criteria based on well intervention program processes or mandates to determine success factors such as timeliness, acceptance and/or scoring standards, (ii) resources such as budget, material, manpower, technology, among others where and all related information are indexed, and (iii) organization-customized categorization to serve specific needs such as geographical distribution, service seasonality, among others.

In one or more embodiments, the program management and AI engine (214) performs the function of a well intervention program manager and artificial intelligence (AI) processor. In particular, the well intervention program manager performs reporting, tracking, viewing, visualizing, communicating, and archiving manage information of well intervention programs, e.g., as shown in LIST 5 below.

List 5 w) Well Intervention Program Activity attributes and flags for the organization front-line employees/members.

x) Well Intervention Program Performance Measure (PM) definition, target, and actual performance for the organization management/executive-level leaders.

y) People-Drive flagged activities for organization-wide employees/members.

z) Audit criteria, success factors, timeliness, acceptance and/or scoring standards.

On the other hand, the AI processor performs machine learning from the well intervention data that is captured, processed, displayed, and archived by the program mandate engine (211), activity plan engine (212), and audit engine (213). In one or more embodiments, the machine learning algorithms include trending and correlating logics that are formulated in programmable equations using one or more of parameters a) through z) listed above. The trending and correlating logics capture data trends, patterns, and correlations of those parameters, predict future results, and produce corrective advices to support well intervention decision making. Different users may use the AI processor embodiments to define the algorithms in different ways based on their respective IT resources and systems, and define workflows on their customized algorithms that serve the users' needs. The machine-learned results are utilized to model the current trend of well intervention program performance, to forecast year-end estimates, and to enhance next business cycle requirements. In particular, the machine learning is performed using the well intervention data as inputs shown in LIST 6 below:

List 6
- aa) Processes (e.g., a number of activities that can be grouped based on defined relationship such as the subject or nature of the activity's action or the job-family of the activity's assignee the data of which are relevant parameters to the AI processor.)
- bb) Actual Performance Measure (PM) (e.g., the post-well-intervention-stimulation gas actual or achieved production rate may be 8 million standard cubic feet per day (MMSCFD).)
- cc) Target Performance Measure (PM) (e.g., the post-well-intervention-stimulation gas production rate target may be 5 MMSCFD.)
- dd) Audit results (e.g., well intervention stimulation maximum pumping pressure is within the well completion burst pressure limits "Yes or No".)
- ee) Other relevant and measurable parameters (e.g., categorization flags may be used for well intervention stimulation activities to indicate "acid fracturing" vs "proppant hydraulic fracturing" as relevant parameters.)

In one or more embodiments, the well intervention management system (160) performs the functionalities described above using the method described in reference to FIG. 2 below. Although the well intervention management system (160) is shown as having four engines (211, 212, 213, 214), in other embodiments of the invention, the well intervention management system (160) may have more or fewer engines and/or more or fewer other components. Further, the functionality of each component described above may be split across components or combined into a single, more robust component. Further still, each component (211, 212, 213, 214) may be utilized multiple times to carry out an iterative operation.

Figure 2:
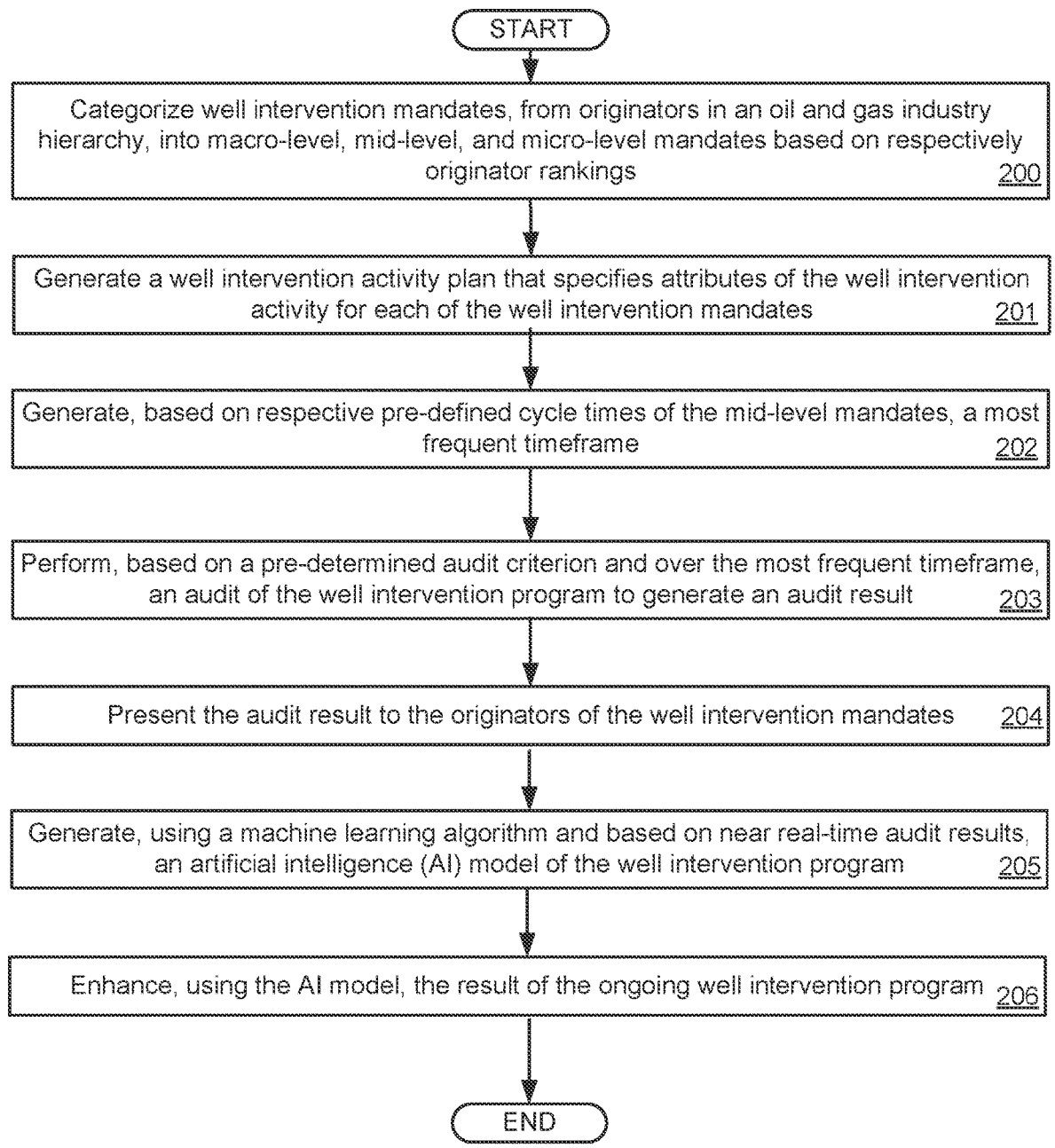
FIG. 2 shows a flowchart in accordance with one or more embodiments.

Turning to FIG. 2, FIG. 2 shows a process flowchart in accordance with one or more embodiments. One or more blocks in FIG. 2 may be performed using one or more components as described in FIGS. 1A and 1B. While the various blocks in FIG. 2 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 200, a collection of well intervention mandates generated by a number of originators in an oil and gas industry hierarchy are categorized, based on respectively originator rankings, into macro-level mandates, mid-level mandates, and micro-level mandates. Each of the well intervention mandates relates to a well intervention activity of the well intervention program.

In Block 201, a well intervention activity plan is generated that specifies attributes of the well intervention activity for each of the well intervention mandates. In one or more embodiments, the well intervention activity plan specifies the intervention activity description, deliverables, timeline, etc. as shown in LIST 1 above.

In Block 202, a most frequent timeframe is generated based on respective pre-defined cycle times of the mid-level mandates. As noted above, the mid-level mandates are selected from the collection of well intervention mandates based on mid-level originator rankings. The cycle times specified in the mid-level mandates form a histogram where the most frequent timeframe is determined as the median or the mode of the histogram. For example, the most frequent timeframe for well intervention surveillance such as casing integrity logging may be one year. In other words, the casing integrity logging is required yearly.

In Block 203, an audit of the well intervention program is performed, based on a pre-determined audit criterion and over the most frequent time frame, to generate an audit result. In one or more embodiments of the invention, near-real-time well intervention result data is obtained over the most frequent timeframe and analyzed to generate the audit result. As used herein, the term "near real-time" means within a time period taken to have human-input data entered into the respective engine for simultaneous results (e.g., 24 hours). For example, the near-real-time well intervention result data may include well intervention data captured through a web-based tool. In one or more embodiments, the web-based tool is a computerized tool that is customizable to fit existing corporate Information Technology (IT) infrastructure, and capable to provide data computing capabilities including capture, process, display, and archive of well intervention data such as the targets and actuals of each data set. In particular, originators throughout the oil and gas industry hierarchy are provided with access to the web-based tool to input well intervention data.

In one or more embodiments, the audit result is generated by at least analyzing the near-real-time well intervention result data based on various attributes for each of the well intervention mandates. For example, a particular well intervention activity is identified based on the people-drive flag as being associated with individual contributions of the originators. The particular well intervention activity is further identified based on a performance measure flag as relating to a key performance target of the well intervention program. Accordingly, success factors of the particular well intervention activity are identified from the pre-determined audit criterion. In particular, the success factors include a contribution measure, a verification measure, and a reward measure. To analyze the near-real-time well intervention result data, the contribution measure is used to identify the individual specific positive contributions, such as value generation, customer satisfaction, technical innovation, etc., the verification measure is used to verify a deliverable outcome of the individual contributions and to designate a reviewer to review the deliverable outcome, and the reward measure is used to verify a level of effort to deliver the individual contributions and a level of impact of the individual contribution to the particular well intervention activity.

In one or more embodiments, a reward is generated, by at least analyzing the near-real-time well intervention result data based on the success factors of the particular well intervention activity, as part of the audit result.

In Block 204, the audit result is presented to the originators throughout the oil and gas industry hierarchy. In one or more embodiments, the audit result is presented using web-based dashboards. Presenting the audit result to all of the macro-level, mid-level, and micro-level originators throughout the oil and gas industry hierarchy advantageously aligns the contributions of all people (not only high-level decision makers) to effectively drive positive business results.

In Block 205, on-going audits of the well intervention program are routinely performed to generate audit results. A machine learning (ML) algorithm is used to generate an artificial intelligence (AI) model of the well intervention program based on the ongoing audit results. ML algorithms are formulated in programmable equations to capture data trends, patterns, and correlations of select parameters to predict future results and produce corrective advices. For example, the ML algorithms may include a supervised ML algorithm, a deep learning (DL) algorithm, a neural network algorithm, etc. The AI model may be one or more of convolutional neural networks, deep neural networks, recurrent neural networks, support vector machines, multilayer perceptron layers, decision trees, inductive learning models, deductive learning models, supervised learning models, etc.

In Block 206, the well intervention mandates of the well intervention program are adjusted based on the AI model to enhance subsequent execution of the well intervention program. In one or more embodiments, a predicted long term well intervention result data of the well intervention program is generated based on the AI model.

Figure 3A:
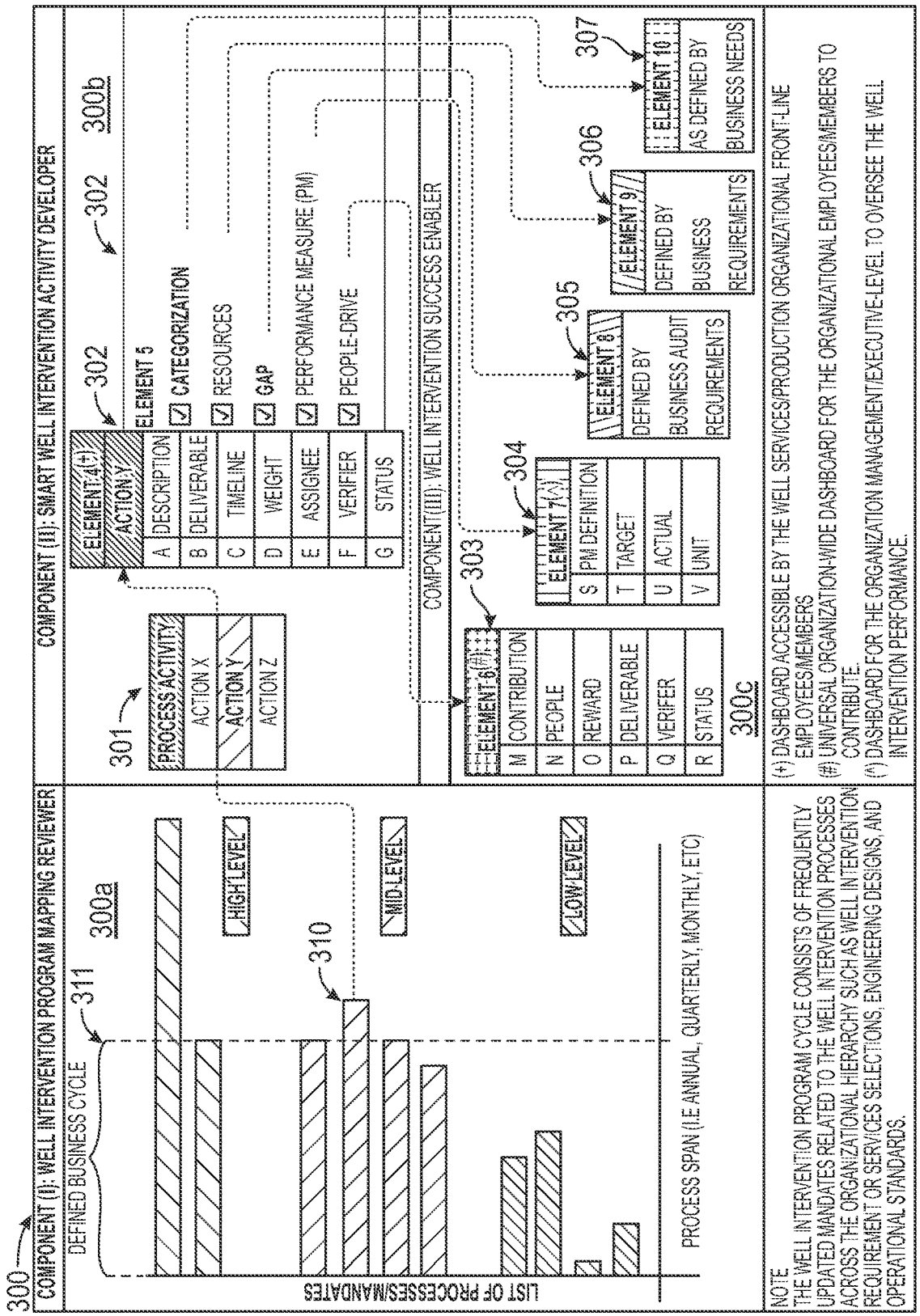
FIGS. 3A-3B show an example in accordance with one or more embodiments.
Figure 3B:
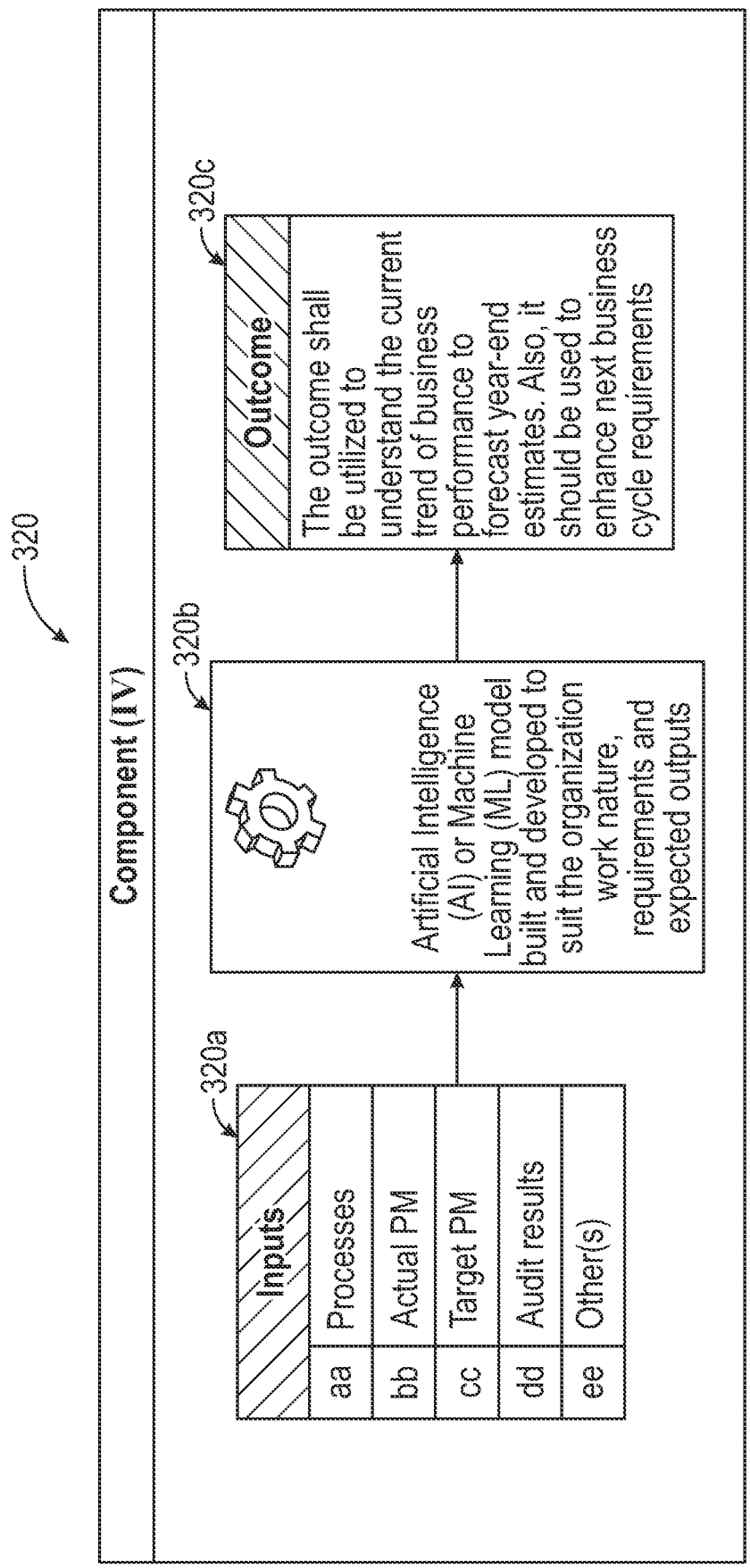

FIGS. 3A-3B show an example in accordance with one or more embodiments. The example shown in FIGS. 3A-3B is based on the system and method described in reference to FIGS. 1A, 1B, and 2 above. One or more of the modules and/or elements shown in FIGS. 3A-3B may be omitted, repeated, combined and/or substituted.

FIG. 3A shows an example diagram (300) of a well intervention program. The diagram (300) corresponds to a graphical user interface for browsing the well intervention data. In particular the diagram (300) includes a well intervention program mapping reviewer dashboard (300a), a smart well intervention activity developer dashboard (300b), and a well intervention success enabler dashboard (300c) that are generated by the program mandate engine, activity plan engine, and audit engine described in reference to FIG. 1B above. The well intervention program mapping reviewer dashboard (300a) shows a list of mandates with respective process spans and separated into the macro-level mandates (i.e., high level), mid-level mandates (i.e., mid-level), and micro-level mandates (i.e., low level) with respective cycle time periods. A defined business cycle (311) is determined based on process spans of the mid-level mandates. Accordingly, all mandates process span such as timeline completion dates are presented in the form of one or a factor of the business cycle value. For example, the mid-level mandates include the mandate (310) that relates to a reservoir stimulation rig-less process where its process span or timeline is 1.2× the defined business cycle (311).

The smart well intervention activity developer dashboard (300b) shows well intervention data of the well intervention program. In response to clicking on the mandate (310) in the well intervention program mapping reviewer dashboard (300a), a pull-down menu (301) is displayed in the smart well intervention activity developer dashboard (300b) to show three actions (i.e., Action X, Action Y, and Action Z) related to the mandate (310) that are defined by the mid-level originator of the mandate (310). For example, the Action Y relates to the hydraulic proppant fracturing job design for Gas Well-100. In response to clicking on the Action Y in the pull-down menu (301), an additional pull-down menu (302) is further displayed in the smart well intervention activity developer dashboard (300b) to show the activity attributes and activity flags of the hydraulic proppant fracturing job design for Gas Well-100. The activity attributes and activity flags a-g in the pull-down menu (302) are defined by the mid-level originator of the mandate (310). In response to clicking on each entry of the pull-down menu (302), the corresponding content of the activity attribute or activity flag is displayed, e.g., as shown in LIST 7 and LIST 8 below. Alternatively, each entry of the pull-down menu (302) may directly display the corresponding content of the activity attribute or activity flag, e.g., as shown in LIST 7 and LIST 8 below.

The well intervention success enabler dashboard (300c) shows well intervention data of the activity flags. In response to clicking each activity flag entry in the pull-down menu (302), pull-down menus (303), (304), (305), (306), and (307) are displayed in the well intervention success enabler dashboard (300c) that correspond to the activity flags of the hydraulic proppant fracturing job design for Gas Well-100. In response to clicking on each entry of the pull-down menus (303)-(307), the corresponding content of the activity flag is displayed, e.g., as shown in LISTs 9, 10, and 11 below. Alternatively, each entry of the pull-down menus (303)-(307) may directly display the corresponding content of the activity flag, e.g., as shown in LISTs 9, 10, and 11 below.

List 7
Activity Attribute:
  a) Action Description: Design the fracturing stages number, techniques, fluid and proppant volumes, fluids and proppants selection needed to achieve the reservoir gas gain target.
  b) Deliverable and closure criteria: Full program document.
  c) Timeline: Nov. 30, 2021.
  d) Weight: 5%.
  e) Assignee/accountability/level: Production Engineer assigned on Gas Well-100.
  f) Verifier: Production Engineering Supervisor.
  g) Status: Planned.

List 8
Activity Flag:
  h) People-Drive: Yes.
  i) Performance Measure: Yes.
  j) Gaps: Yes.
  k) Resources: Yes.
  l) Categorization: Yes.

List 9
People-Drive Flag:
  m) Contribution: Ground water conservation to achieve company target of 50% water reduction for industrial use
  n) People: Engineers, Assistant Engineers, Operators, Foremen, Scientists
  o) Reward: 30 Points.
  p) Deliverable: Full proposal document.

q) Verifier: Environmental Protection Department Leader.
r) Status: Below are 3 example cases
Engineers develop a proposal to reduce water in proppant fracturing by applying energized fluids in depleted reservoirs (Accepted).
Operator enhances water frac tanks design to eliminates dead volumes (submitted)
Scientists proposes research area to use waterless and filtered seawater fracturing (submitted)

List 10
Performance Measures (PM)
s) Performance measure definition: Post-stimulation gas production rate gain.
t) Target: 5.
u) Actual performance: 8.
v) Unit: MMSCFD.

List 11
Audit Criteria Examples
Well integrity: maximum fracturing pumping pressure within the well completion burst pressure limits.
Resources Examples
Frac simulation software and training.
Organization-Customized Categorization Examples
Conventional resources team.
Unconventional resources team.

FIG. 3B shows an example diagram (320) of the well intervention program depicted in FIG. 3A above. The diagram (320) illustrates the machine learning process of the program management and AI engine described in reference to FIG. 1B above. Based on the above example depicted in FIG. 3A, well intervention data captured through a web-based tool for near-real time audit by the various entities are used as inputs (320a) to generate the AI machine learning model (320b) that has machine learning ability to capture trends and applies learning. The outcome (320c) of utilizing the AI machine learning model (320b) is used to optimize the mandates and activity plans of the well intervention program, to forecast year-end well intervention results, and to enhance next business cycle well intervention requirements. For an example wellbore static-bottom hole pressure rig-less surveillance, the job efficiency is enhanced by 5% through a customized design based on eliminating multiple slickline runs for a wellbore drift and pressure survey. Applying a single run for both wellbore drift and pressure survey is based on digital slickline technologies and yields an estimated value of $250,000 in a full business plan cycle.

Figure 4A:
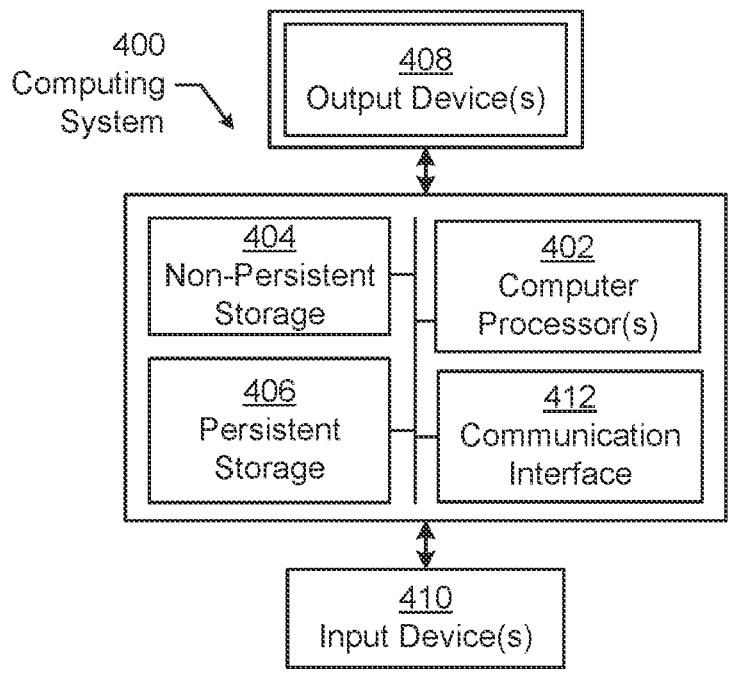
FIGS. 4A and 4B show a computing system in accordance with one or more embodiments.

Embodiments may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touch-screen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 4B:
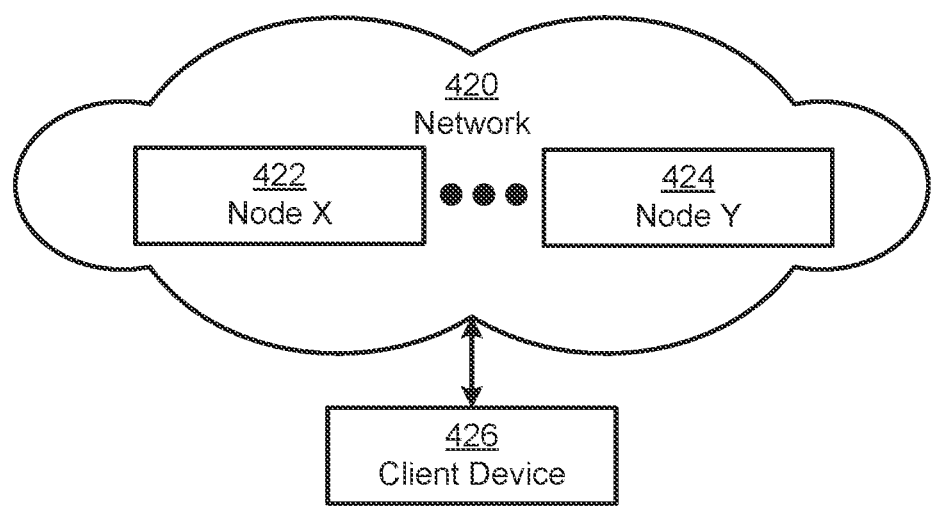

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for performing a well intervention operation, comprising:
selecting, from a plurality of well intervention mandates generated by a plurality of originators in an oil and gas industry hierarchy, mid-level mandates based on respectively originator rankings, wherein each of the plurality of well intervention mandates relates to a well intervention activity of the well intervention operation;
generating, based on respective pre-defined cycle times of the mid-level mandates, a most frequent timeframe;
generating a well intervention activity plan, wherein the well intervention activity plan specifies activity attributes and activity flags of the well intervention activity for each of the plurality of well intervention mandates, wherein the activity attributes comprise a deliverable measure, a pre-defined cycle time, an impact weighting, a designated human resource, and a status measure, wherein the activity flags comprise a people-drive flag;
performing a particular well intervention activity comprising a hydraulic fracturing of a well;
obtaining near-real-time well intervention result data over the most frequent timeframe, wherein the near-real-time well intervention result data comprises a performance measure of the hydraulic fracturing of the well;
performing, based on a pre-determined audit criterion and over the most frequent timeframe, an audit of the well intervention operation to generate an audit result, wherein the audit result is generated by at least analyzing the near-real-time well intervention result data based on the activity attributes for each of the plurality of well intervention mandates;
identifying, based on the people-drive flag, the particular well intervention activity that is associated with individual contributions of the plurality of originators;
identifying, from the pre-determined audit criterion, success factors of the particular well intervention activity, wherein the success factors comprise a contribution measure, a verification measure, and a reward measure;
generating, by at least analyzing the near-real-time well intervention result data based on the success factors of the particular well intervention activity, a reward as part of the audit result;
presenting the audit result to the plurality of originators; and
performing, by a well control system and subsequent to presenting the audit result and based at least on the audit result, the well intervention operation,
wherein performing the well intervention operation comprises applying a single surveillance run for at least two downhole survey operations to improve an efficiency of the well intervention operation based on the most frequent timeframe, and
wherein performing the well intervention operation further comprises controlling and executing, with the well control system, drilling a borehole with a Bottom Hole Assembly (BHA) of a rig.

2. The method of claim 1,
wherein the verification measure describes a deliverable outcome to verify the individual contributions and designates a reviewer to review the deliverable outcome for verifying the individual contributions.

3. The method of claim 1,
wherein the reward measure describes a level of effort to deliver the individual contributions and a level of impact of the individual contribution to the particular well intervention activity.

4. The method of claim 1,
wherein the activity flags further comprise a performance measure flag,
wherein the particular well intervention activity is further identified, based on the performance measure flag, as relating to a key performance target of the well intervention operation.

5. The method of claim 1, further comprising:
performing, based on the pre-determined audit criterion and the most frequent timeframe, a plurality of audits comprising the audit of the well intervention operation to generate a plurality of audit results comprising the audit result; and
generating, using a machine learning algorithm and based on the plurality of audit results, an artificial intelligence (AI) model of the well intervention operation.

6. The method of claim 5, further comprising:
adjusting, based on the AI model, the plurality of well intervention mandates of the well intervention operation,
wherein the adjusted plurality of well intervention mandates is used for the well intervention operation subsequent to the plurality of audits.

7. The method of claim 6, further comprising:
generating, based on the AI model, a predicted long term well intervention result data of the well intervention operation subsequent to the plurality of audits.

8. The method of claim 7,
wherein adjusting, based on the AI model, the plurality of well intervention mandates of the well intervention operation improves the predicted long term well intervention result data.

9. A system for performing a well intervention operation, comprising:
a well control system for performing well intervention activities, a particular well intervention activity comprising a hydraulic fracturing of a well; and
a well intervention management system comprising:
an operation mandate engine configured to select, from a plurality of well intervention mandates generated by a plurality of originators in an oil and gas industry hierarchy, mid-level mandates based on respectively originator rankings, wherein each of the plurality of well intervention mandates relates to a well intervention activity of the well intervention operation;
an activity plan engine configured to
generate, based on respective pre-defined cycle times of the mid-level mandates, a most frequent timeframe; and
generate a well intervention activity plan,
wherein the well intervention activity plan specifies activity attributes of the well intervention activity for each of the plurality of well intervention mandates, wherein the activity attributes comprise a deliverable measure, a pre-defined cycle time, an impact weighting, a designated human resource, and a status measure, and
wherein the well intervention activity plan further specifies activity flags of the well intervention activity for each of the plurality of well intervention mandates, wherein the activity flags comprise a people-drive flag;

an audit engine configured to:
  obtain near-real-time well intervention result data over the most frequent timeframe, wherein the near-real-time well intervention result data comprises a performance measure of the hydraulic fracturing of the well;
  perform, based on a pre-determined audit criterion and over the most frequent timeframe, an audit of the well intervention operation to generate an audit result, wherein the audit result is generated by at least analyzing the near-real-time well intervention result data based on the activity attributes for each of the plurality of well intervention mandates;
  identify, based on the people-drive flag, the particular well intervention activity that is associated with individual contributions of the plurality of originators;
  identify, from the pre-determined audit criterion, success factors of the particular well intervention activity, wherein the success factors comprise a contribution measure, a verification measure, and a reward measure; and
  generate, by at least analyzing the near-real-time well intervention result data based on the success factors of the particular well intervention activity, a reward as part of the audit result; and
an operation management and artificial intelligence (AI) engine configured to present the audit result to the plurality of originators,
wherein the well control system performs, subsequent to presenting the audit result and based at least on the audit result, the well intervention operation,
wherein performing the well intervention operation comprises applying a single surveillance run for at least two downhole survey operations to improve an efficiency of the well intervention operation based on the most frequent timeframe and
wherein performing the well intervention operation further comprises controlling and executing, with the well control system, drilling a borehole with a Bottom Hole Assembly (BHA) of a rig.

10. The system of claim 9,
wherein the verification measure describes a deliverable outcome to verify the individual contributions and designates a reviewer to review the deliverable outcome for verifying the individual contributions.

11. The system of claim 9,
wherein the reward measure describes a level of effort to deliver the individual contributions and a level of impact of the individual contribution to the particular well intervention activity.

12. The system of claim 9,
wherein the activity flags further comprise a performance measure flag,
wherein the particular well intervention activity is further identified, based on the performance measure flag, as relating to a key performance target of the well intervention operation.

13. The system of claim 9,
wherein the audit engine is further configured to perform, based on the pre-determined audit criterion and the most frequent timeframe, a plurality of audits comprising the audit of the well intervention operation to generate a plurality of audit results comprising the audit result, and
wherein the operation management and AI engine is further configured to generate, using a machine learning algorithm and based on the plurality of audit results, an AI model of the well intervention operation.

14. The system of claim 13,
wherein the operation mandate engine is further configured to adjust, based on the AI model, the plurality of well intervention mandates of the well intervention operation, and
wherein the adjusted plurality of well intervention mandates is used for the well intervention operation subsequent to the plurality of audits.

15. The system of claim 14,
wherein the operation management and AI engine is further configured to generate, based on the AI model, a predicted long term well intervention result data of the well intervention operation subsequent to the plurality of audits.

16. The system of claim 15,
wherein adjusting, based on the AI model, the plurality of well intervention mandates of the well intervention operation improves the predicted long term well intervention result data.

* * * * *